(No Model.)

C. W. PARSONS.
CRANE.

No. 586,454.

Patented July 13, 1897.

Witnesses:
Fred W. Goodurn
Murray C. Boyer

Inventor:
Calvin W. Parsons
by his Attorneys
Howson & Howson (No Model.)

C. W. PARSONS.
CRANE.

Patented July 13, 1897.

FIG. 4.

Witnesses:
Fred D. Goodwin
Murray C. Boyer

Inventor:
Calvin W. Parsons
by his Attorneys Howson & Howson (No Model.)  12 Sheets—Sheet 3.

C. W. PARSONS.
CRANE.

No. 586,454.  Patented July 13, 1897.

Witnesses:
Fred D. Goodwin
Murray C. Boyer

Inventor
Calvin W. Parsons
by his Attorneys
Howson & Howson (No Model.)

C. W. PARSONS.
CRANE.

No. 586,454.

Patented July 13, 1897.

FIG. 8.

Witnesses:
Fred D. Goodwin
Murray C. Boyer

Inventor:
Calvin W. Parsons
by his Attorneys
Howson & Howson

(No Model.) 12 Sheets—Sheet 3.

C. W. PARSONS.
CRANE.

No. 586,454. Patented July 13, 1897.

Witnesses:
Fred L. Goodwin
Murray C. Boyer

Inventor:
Calvin W. Parsons
by his Attorneys
Howson & Howson (No Model.) 12 Sheets—Sheet 9.
C. W. PARSONS.
CRANE.

No. 586,454. Patented July 13, 1897.

Witnesses:
Fred D. Goodwin
Murray C. Boyer

Inventor:
Calvin W. Parsons
by his Attorneys
Howson & Howson (No Model.)  12 Sheets—Sheet 10.

C. W. PARSONS.
CRANE.

No. 586,454. Patented July 13, 1897.

Witnesses:
Fred D. Goodwin
Murray C. Boyer

Inventor:
Calvin W. Parsons
by his Attorneys
Howson & Howson (No Model.)

C. W. PARSONS.
CRANE.

No. 586,454.  Patented July 13, 1897.

Witnesses:
Fred D. Goodwin
Murray C. Boyer

Inventor:
Calvin W. Parsons
by his Attorneys
Howson & Howson

UNITED STATES PATENT OFFICE.

CALVIN W. PARSONS, OF SCRANTON, PENNSYLVANIA.

CRANE.

SPECIFICATION forming part of Letters Patent No. 586,454, dated July 13, 1897.

Application filed June 18, 1891. Serial No. 396,722. (No model.)

*To all whom it may concern:*

Be it known that I, CALVIN W. PARSONS, a citizen of the United States, and a resident of Scranton, Lackawanna county, Pennsylvania, have invented certain Improvements in Cranes, of which the following is a specification.

One object of my invention is to so construct the girder, bridge, jib, or other trolley-carrying part of a crane that it will possess the maximum of rigidity with a very considerable decrease in size and weight as compared with cranes now in use and, owing to such rigidity, will effectually resist lateral as well as vertical strains, and can therefore be used for hauling or dragging as well as for lifting loads.

Another object is to so dispose the mechanism of the crane that it is out of the way and can be effectively incased and protected from injury or from deterioration due to accumulations of dust or dirt or from exposure to the weather.

A further object is to so construct the trolley as to render it light and cheap and to provide for such disposal of the lifting strains as to compensate for or counteract a portion of the strain upon the trolley-carrying bridge or girder.

Minor objects and features of construction are so fully set forth and claimed hereinafter as to render unnecessary any preliminary reference thereto.

In the accompanying drawings, Fig. 4ª is a view, partly in elevation and partly in vertical section, of so much of the crane as is illustrated in Fig. 4. Fig. 5ª is a view, partly in elevation and partly in vertical section, of so much of the crane and operating mechanism as are shown in Fig. 5. Fig. 6ª is a side elevation of so much of the structure as is shown in Fig. 6.

In the present instance I have illustrated my invention as applied to that class of cranes in which the "bridge" in the form of a girder is provided at each end with a truck having wheels adapted to suitable rails or runways mounted in the building or other location where the truck is to be used, but it should be understood that the main features of my invention are not limited to a crane of this character, but can be applied to jib-cranes, walking-cranes, gantries, and the like, and the driving mechanism which I have shown in connection with the crane may also be used for lifting or hauling purposes generally—for instance, on inclined planes or for operating turn-tables, drawbridges, elevators, and the like, this portion of the mechanism forming the subject of a separate application, Serial No. 399,616, filed July 15, 1891.

For convenience in the present case I will refer in succession to the various parts of the crane, taking up in their order, first, the construction of the bridge, its trucks, and runways; second, the construction of the trolley and its mounting upon the bridge; third, the mechanism for operating the main power-shaft and for causing said bridge to move to and fro on the runways; fourth, the mechanism for moving the trolley to and fro on the bridge, and, fifth, the mechanism for operating the hoisting and hauling chains.

Figure 2:
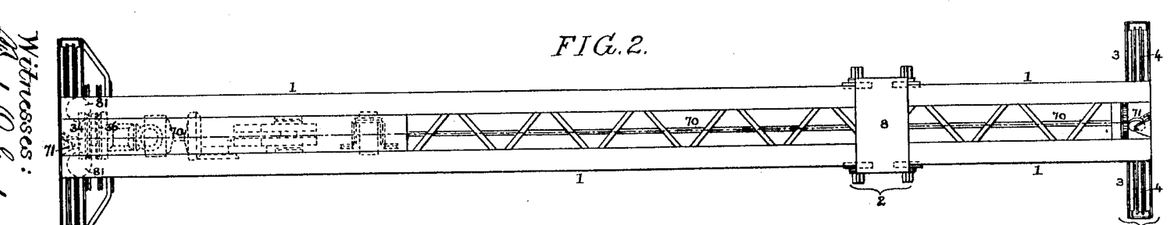
Fig. 2 is a plan view of the crane or of so much of the same as is shown in Fig. 1.

*The bridge, trucks, and runways.*—The main feature of construction of the bridge 1 is the making of the same in the form of a single box-girder—that is to say, a girder having side, top, and bottom plates, so that it presents a box-like cross-section, the trolley 2 spanning or surrounding the girder and being mounted upon the outside of the same, so that it does not interfere with the closing of the top of the girder by continuous plating, although in practice it will generally be sufficient to form the top and bottom of the girder by means of lattice-bars extending between the opposite side plates and suitably secured to each of the same, as shown in Fig. 2. It is preferable, however, to provide continuous top and bottom plates in those portions of the bridge which contain the driving mechanism, so that the latter may be inclosed and protected from deterioration by dust and dirt or from exposure to the weather.

In double-girder cranes as commonly constructed, where two independent girders are used and where the hoisting-chains pass down between the girders, it is impossible to connect said girders except at the extreme ends, so that each girder must have sufficient width to make it secure against twisting or overturning under the combined weight of the load and accidental side strains. The construction which I have adopted insures great economy of material and saving of dead-weight, and the box-girder, moreover, has such an excess of lateral strength that it can be used for dragging as well as for lifting loads without danger of any lateral failure, and this form of girder, as before stated, provides ample room for the operating mechanism in its interior where such mechanism is protected from dust and from the weather.

Owing to the great lateral strength of the bridge my improved crane can be used for docks, freight-houses, quarries, and yards, as it can drag anything into which slings can be hooked and can haul the same from any point in its vicinity to a point from which it can pick it up and carry it away.

The bridge 1 of the crane is provided at each end with a truck 3, likewise constructed, by preference, in the form of a box-girder, and each of these trucks has independent wheels 4, of large diameter, running upon rails mounted upon suitable girders 5, which are supported upon columns 6, or in any other way which the location of the crane may suggest as the most appropriate.

The truck-wheels are not geared or driven, so that their diameters do not need to correspond, as in cranes which are propelled by rotating their truck-wheels.

*The trolley and trolley-mounting.*—The trolley 2 is merely a carriage for the upper sheaves of the hoisting-chains, and having no machinery to carry with it it can be of light weight and of minimum cost and imposes the least possible extra load on the main girder, thus minimizing the requirements of said main girder, both as to material and cost.

Figure 10:
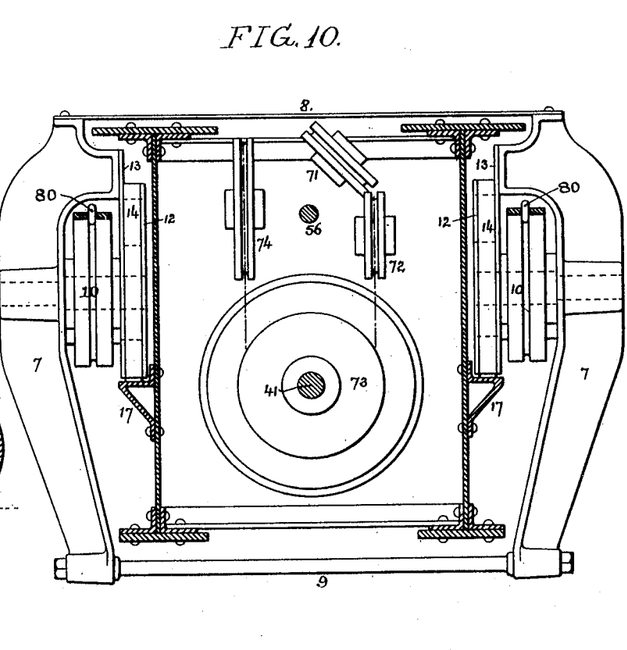
Fig. 10 is a transverse section of the bridge of the crane adjacent the trolley-operating mechanism, the trolley being shown in elevation.

The trolley shown in Fig. 10 is composed of opposite side frames 7, a connecting top plate 8, above the bridge-girder 1 and bars 9, connecting the depending legs of the side frames 7 below said girder.

Figure 11:
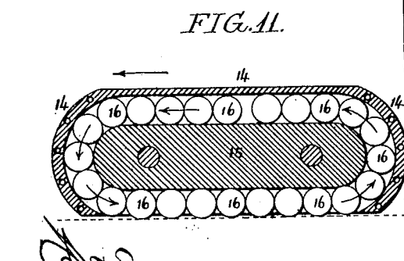
Figs. 11 and 12 are respectively a longitudinal and a transverse section of the trolley-bearing.
Figure 12:
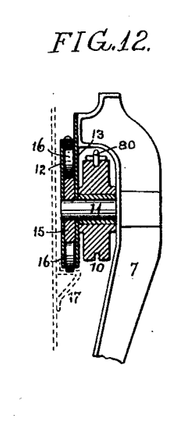

The sheaves 10 for the hoisting-chain at each side of the trolley are mounted so as to turn freely upon spindles 11, and secured to each of the side frames 7 of the trolley, between said frame and the side web of the bridge-girder, is a roller-carrying frame consisting of inner and outer plates 12 and 13, an intermediate outer shell 14, and a central elongated block 15, said block having flat top and bottom and rounded ends and the shell 14 being likewise flat at the top and bottom and rounded at the ends, but open at the bottom, as shown in Fig. 11. Within this frame are a series of rollers 16, large in diameter in proportion to their thickness and running upon rails 17, secured to the side webs of the bridge-girder, each of these rails in the present instance consisting of a hollow angular rolled shape riveted to the side web, although any available form of rail may be used, as desired.

As the trolley is traversed on the bridge in one direction or the other the rollers 16 run in the reverse direction along the rails, rising to the top of the carrying-frame around the rear end of the central block 15 and moving downward around the front end of the block, so as to again bear upon the rail 17, as shown in Fig. 11, thus providing an antifriction-roller bearing for the trolley and facilitating the movements of the same.

The large diameter of the rollers in proportion to their thickness prevents them from becoming skewed on the track, and the rollers may, if desired, be replaced by an equal bulk of comparatively thin disks, each of which may lap its neighbor at random, but which, owing to its thinness or short length along its axes, cannot become skewed.

Figure 13:
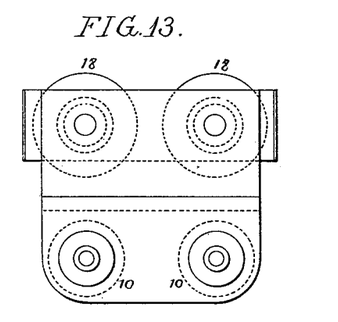
Figs. 13 to 18, inclusive, are views illustrating certain modifications or special features in the construction of the trolley.
Figure 14:
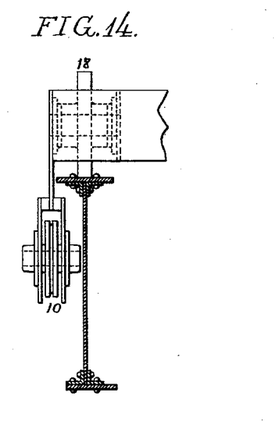

While the roller-bearing for the trolley is preferred for the reasons given, it is not absolutely essential to the proper carrying out of my invention, as the trolley may be supported upon wheels instead of rollers, if desired. For instance, in Figs. 13 and 14 I have shown a form of trolley having a heavy frame above the bridge-girder, this frame being provided with rollers 18, running on the top of the girder, and in Fig. 15 I have shown the trolley as provided with rollers 19, running upon a rail 17 at the side of the girder.

The trolley shown in Fig. 10 has side frames, connected at the top by the transverse plate 8 in order to resist the tendency of the sides to spread apart at the top, their tendency to close together at the bottom being resisted by the transverse rods 9. Other means, however, may be adopted for the purpose. For instance, in the trolley shown in Fig. 15 the tendency to close together at the bottom is resisted by the sheave-axles 20, which extend from one side frame to the other, the sheaves in this case being below the bottom of the girder, and in the trolley shown in Fig. 16 the tendency of the side frame to approach at their lower ends is resisted by horizontal rollers 21, running upon a rail 22, formed by flanges at the bottom of the girder, while in the trolley shown in Fig. 17 any tendency of the side frames to spread apart at the top is resisted by horizontal rollers 23, running on a rail 24, secured to lateral extensions on the top bars or plates of the girder or to any suitable flange projecting from the side web of the girder.

Figure 18:
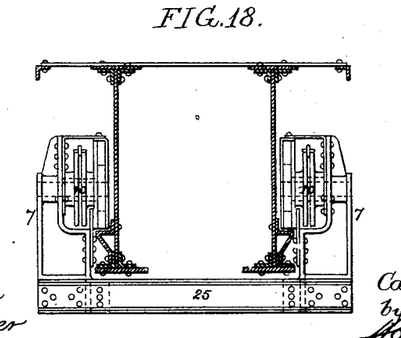

In Fig. 18 I have shown an underhung trolley in which the side frames are strongly braced and are connected by rigid cross-beams 25, extending beneath the bottom of the girder and serving to resist both compression and tension, so as to maintain the side frames of the trolley in proper vertical alinement.

Figure 17:
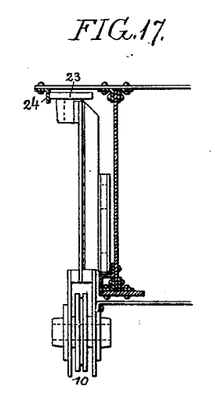

The constructions shown in Figs. 17 and 18 permit me to widen the top flange of the girder to any desired extent, thereby adapting the crane to extraordinary spans and to extraordinary work, such as dragging freight out of doorways, pulling cars about on their tracks, or otherwise involving great side strains.

Figure 15:
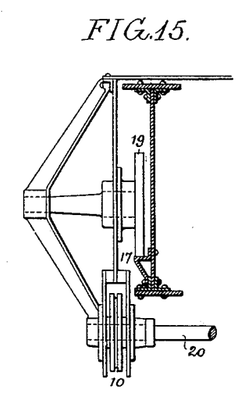
Figure 16:
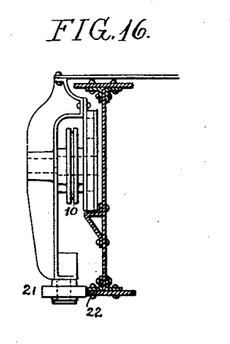

When the sheaves 10 for the hoisting-chain are below the lower flange of the girder, as shown in Figs. 15 and 17, so as to bring the hoisting-chain near the lower flange, a valuable result is attained.

The plate 8 or the rollers 23 and rails 24 equally constitute means for bracing or retaining the side frames of the trolley, so as to prevent spreading at the top, and in like manner the rods 9, sheave-shaft 20, rollers 21, and rails 22, or the beam 25 constitute means for bracing or retaining said side frames of the trolley, so as to prevent them from closing together at the bottom.

When a rectangular girder is loaded in the middle, the top flange is always in compressive strain and the lower flange always in tension, and when the hoisting-chain is near the top flange the compression is increased by the amount of tension in the chain. In all ordinary cases this increase is easily provided for; but in extra long spans, where the radius of gyration of the girder is small in proportion to its length, it is preferable to locate the chain near the lower flange in order that the tension upon the same may partially neutralize the tension upon the lower flange of the girder, the chain acting in effect like a bowstring in an arched girder. (See Fig. 23.)

As the trolley is supported upon the side webs of the girder the top or bottom flanges of the same, or both in some cases, may be curved or parabolic or other desired outline.

The trolleys shown provide for a hoisting-chain at each side; but a single chain can be used if the trolley-sheaves are located beneath the girder and along the center line of the same, but in that case the hook cannot rise as high as when the sheaves are at the sides of the girder.

The lifting-hook 26 is swiveled to the center of a bar 27, which has at opposite ends sheaves 28 for receiving the hoisting-chains from the sheaves 10, and, if desired, these sheaves 28 and the sheaves 10 may be doubled or tripled, so as to permit the use of more than one strand of chain or to increase the lifting power, as in ordinary tackle-blocks, and the sheaves 28 may, if desired, be provided with housings of any desired character.

*Driving mechanism.*—Power is applied to the crane by means of a running chain, rope, or belt, which is endless and runs continuously in one direction, a chain being preferred because of the positive character of the drive which can thus be effected.

Figures 19, 20, 23:
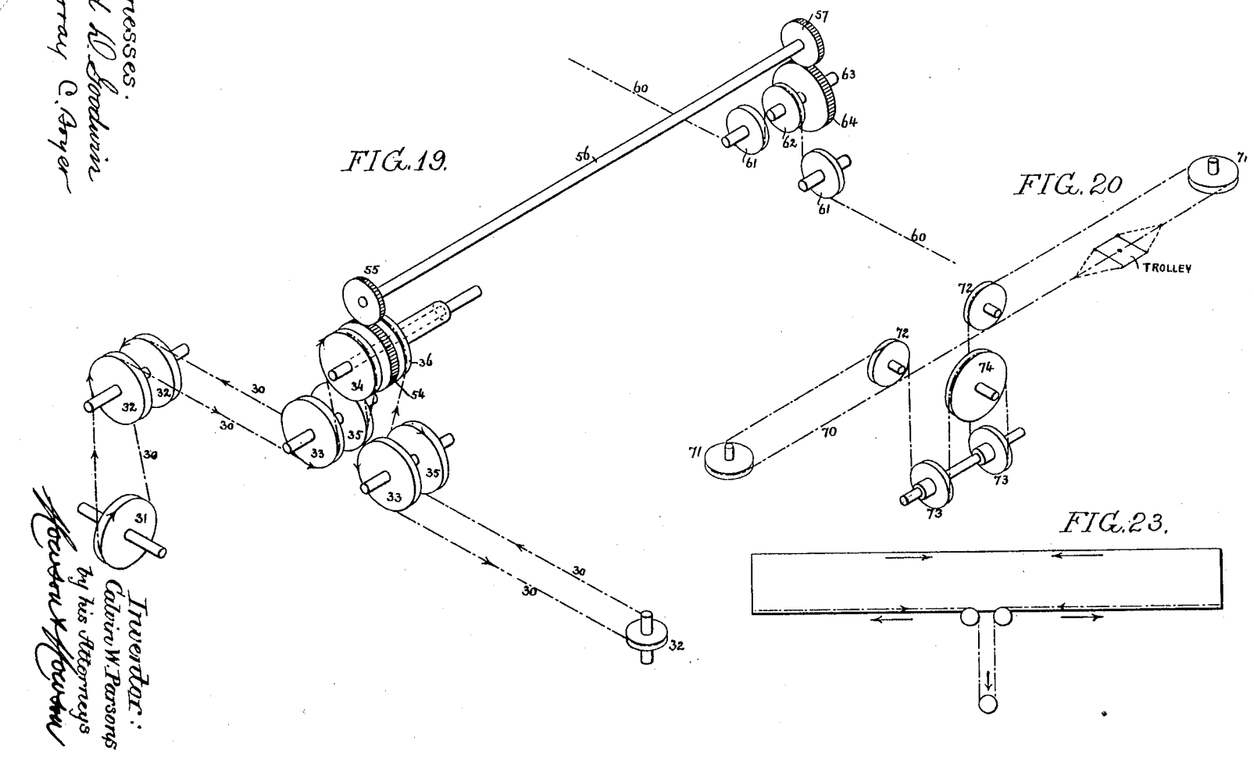
Fig. 19 is a perspective diagram illustrating the mechanism for driving the main shaft on the bridge of the crane and for moving said bridge to and fro on its runways.
Fig. 20 is a perspective diagram illustrating the gearing for moving the trolley to and fro on the bridge of the crane.
Fig. 23 is a diagram illustrating a certain feature of the invention.

The chain, which is represented at 30 in the diagram Fig. 19, passes around a sprocket-wheel 31, the shaft of which is suitably mounted in fixed bearings at either end of the runway 5 at the driving end of the crane, power being applied to this shaft by any suitable motor.

The chain 30 runs upon suitable guiding and supporting sheaves 32 on the runway 5, and one run of the chain passes around guiding-sheaves 33 and a sprocket-wheel 34, while the other run of the chain passes around guiding-sheaves 35 and a sprocket-wheel 36, these sheaves 33 and 35 and sprocket-wheels 34 and 36 being carried by and moving with the bridge of the crane.

Figure 7:
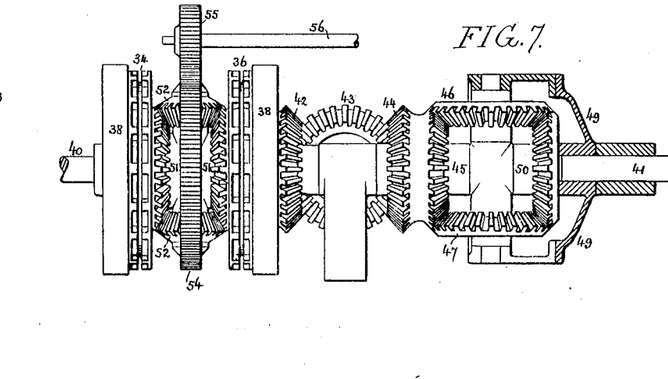
Fig. 7 is a side elevation of part of the mechanism shown in Fig. 4ª, some of the parts being extended, however, so as to prevent them from being hidden by the parts which surround them.
Figures 7A, 21A, 24:
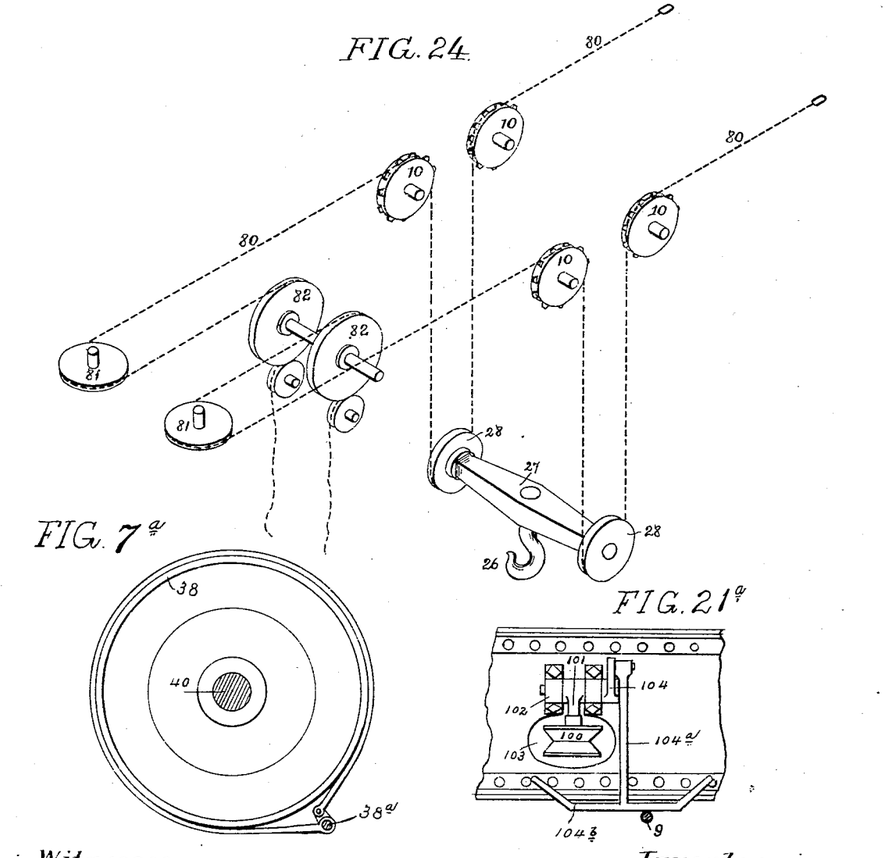
Fig. 24 is a perspective diagram of the hoisting-gearing.
Figure 8:
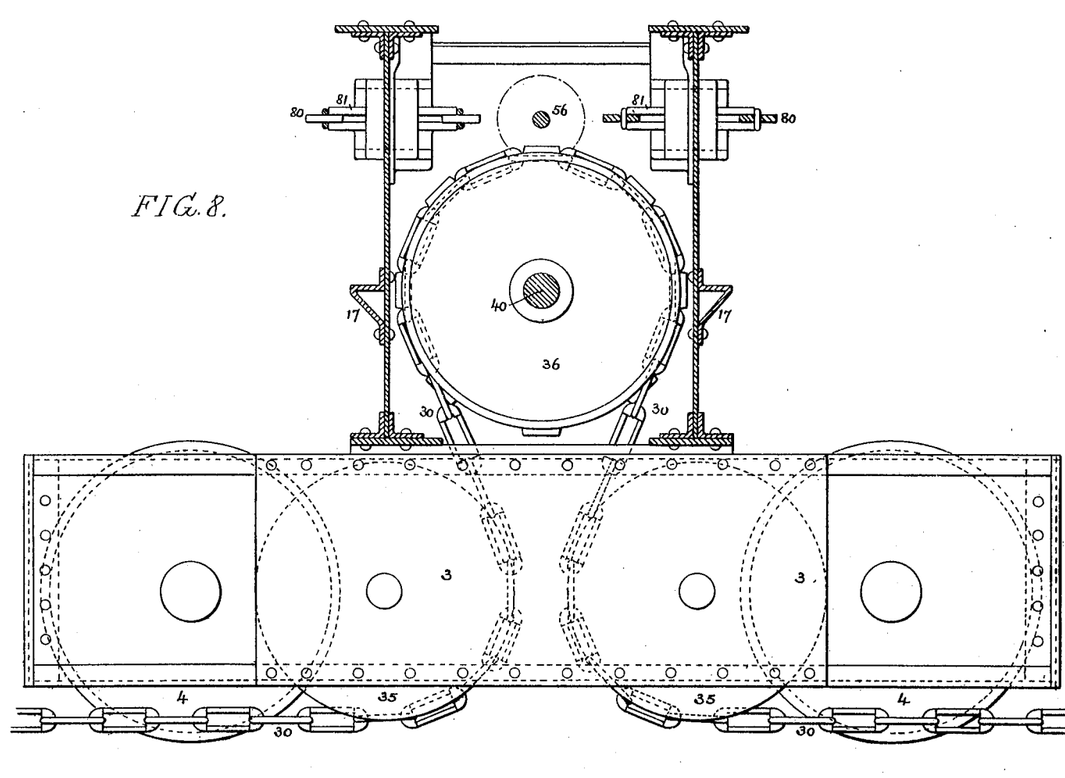
Fig. 8 is a transverse section of the bridge of the crane, showing in elevation some of the gearing at the driving end of said bridge.

As the two runs of the chain move in opposite directions, as indicated by the arrows in Fig. 19, the sprocket-wheels 34 and 36 also revolve in opposite directions. Hence when the bridge of the crane is standing still said sprocket-wheels will rotate with equal velocity, but if the bridge moves in one direction—say toward the end wheels 32 (shown in Fig. 19)—the sprocket-wheel 34 will rotate at a higher speed than the sprocket-wheel 36, depending upon the rate of movement of the bridge, and in the same manner, if the bridge is moved in the opposite direction, the sprocket-wheel 36 will rotate at a greater velocity than the wheel 34. Hence if power for lifting or other motion was taken directly from either of the sprocket-wheels 34 or 36 it would be variable—that is to say, it would fluctuate according to the speed at which the crane moved along its runways and according to the direction in which it moved. In order to supply steady power for hoisting and trolley movement, therefore, I employ the gearing best shown in Figs. 4, 4ª, and 7, on reference to which it will be observed that the bridge has suitable bearings 37 for the support of two shafts 40 and 41, the latter being the shaft which is to be uniformly driven and from which the power for hoisting and trolley movement is derived.

Figure 4:
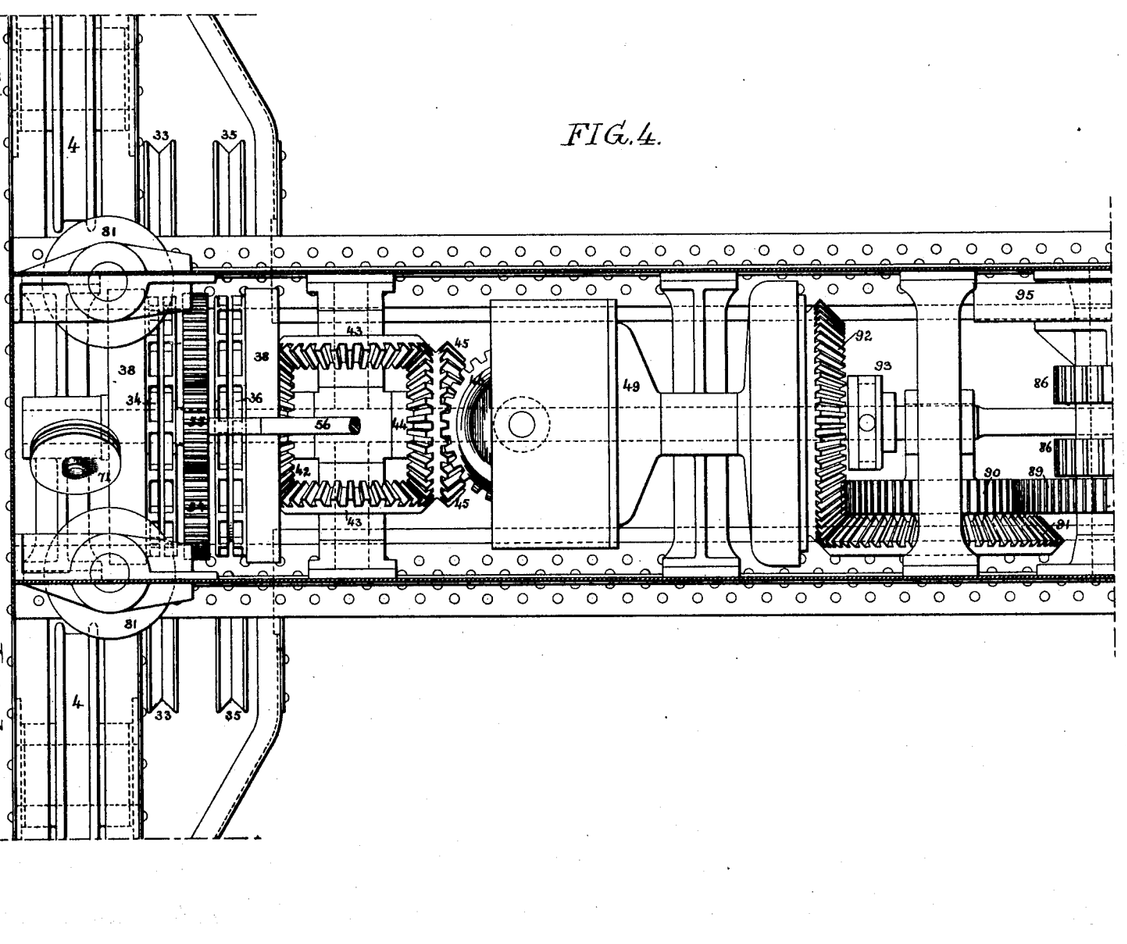
Fig. 4 is a plan view, on a larger scale, of part of the inner or driving end of the crane, showing some of the operating mechanism in detail.
Figure 4A:
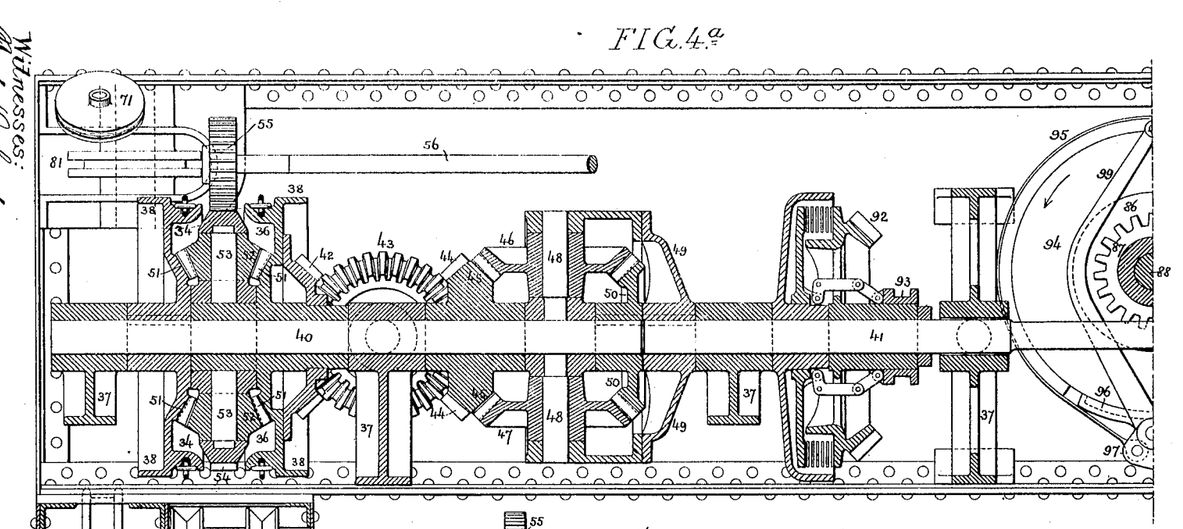

The sprocket-wheel 34 is keyed or otherwise rigidly secured to the shaft 40, but the sprocket-wheel 36 has a hub which can turn loosely on said shaft, and to said wheel 36 is secured a miter-wheel 42, which meshes with a pair of miter-wheels 43, hung to suitable transverse spindles in the girder, these wheels 43 meshing with one face 44 of a double miter-wheel which turns loosely on the shaft 40, and the other face 45 of which meshes with miter-wheels 46 and 47, which are counterparts of each other, and are carried by spindles 48 on a frame or spider 49, which is keyed or otherwise rigidly secured to the shaft 41. The miter-wheels 46 and 47 are also in mesh with a miter-wheel 50, secured to the shaft 40 and having the same number of teeth as the wheel 45. It will therefore be seen that the miter-wheels 45 and 50 rotate in the same direction—that is to say, in the direction of rotation of the sprocket-wheel 34—the gearing interposed between the sprocket-wheel 36 and the miter-wheel 45 serving to reverse the direction of movement of said miter-wheel in respect to that of the sprocket-wheel 36. So long, therefore, as the sprocket-wheels 34 and 36 rotate in opposite directions at equal speeds the miter-wheels 45 and 50 will rotate at equal speeds in the same direction and the miter-wheels 46 and 47, and consequently the spider 49, carrying the same, will be rotated at like speed around the axes of the shafts 40 and 41, there being no movement of said miter-wheels 46 and 47 on their own axes. Consequently the shaft 41 will be driven in the same direction and at the same speed as the shaft 40. If, however, the sprocket-wheel 36 slows up and the wheel 34 rotates with correspondingly greater velocity, owing to the movement of the bridge along its runways, as above mentioned, the miter-wheel 45 will slacken its speed and the miter-wheel 50 will rotate with correspondingly-increased velocity, but in all cases the sum of the speeds both of the sprocket-wheels 34 and 36 and of the miter-wheels 45 and 50 will be absolutely constant, owing to the fact that the speed is derived from a continuous chain having uniform linear velocity in both runs or in all its parts, and as the sum of the speed is constant its average must always be constant, and this average is the speed at which the shaft 41 is driven regardless of the variations in the rotative velocity of the sprocket-wheels 34 and 36, for the difference in the speeds of the miter-wheels 45 and 50 is represented by a corresponding number of rotations of the transmitting-wheels 46 and 47 around their own axes. For instance, if the average speed of the sprocket-wheels 34 and 36, and hence of the miter-wheels 45 and 50, is one hundred revolutions per minute, the speed of the miter-wheel 45 should be dropped to eighty revolutions a minute and that of the miter-wheel 50 would increase to one hundred and twenty revolutions a minute, and in imparting one hundred turns to the carrying frame or spider 49 each of the miter-wheels 46 and 47 would turn twenty times on its own axes, so as to compensate for the twenty extra turns of the miter-wheel 50 and the twenty less turns of the miter-wheel 45. This is on the supposition that all of the wheels 45, 46, 47, and 50 have the same number of teeth. If the wheels 46 and 47 have a less number of teeth than the wheels 45 and 50, there will be a correspondingly greater number of turns, and if more teeth a correspondingly less number of turns than above indicated, as will be readily understood. Whatever, therefore, may be the increase in the speed of one sprocket-wheel in respect to the other the shaft 41 would have a speed representing the constant average of speed of the two sprocket-wheels.

The two miter-gears 43 and two miter-gears 46 and 47 are employed for the purpose of equalizing the strains and steadying the motion, but it will be evident that so far as regards the mere transmission of power one gear of each of these pairs might be dispensed with.

If swift-running ropes or belts are employed in place of the chain 30, friction-gears may be advantageously substituted for the toothed gearing shown and described, and such other constructive modifications as commend themselves can also be made.

Each of the sprocket-wheels 34 and 36 has a wide rim 38 for the application of a suitable brake-band, shoe, or other convenient braking device, (see Fig. 7ª,) the operating-rod 38ª of said braking device being under convenient control of the attendant in the cage 39, and the speed of either wheel can be reduced by the application thereto of a greater or less braking force, and when the braking power is applied to either wheel that wheel will be compelled to follow the run of the chain with which it engages at a speed depending upon the braking force applied. For instance, if the chain is running at the rate of three hundred feet per minute and the sprocket-wheels have a circumference of three feet, representing one hundred turns per minute when the bridge is stationary, braking of either wheel so as to limit its speed by, say, twenty-five per cent. will cause it to travel with its engaging chain at the rate of seventy-five feet per minute, the other two hundred and twenty-five feet of movement of the chain during such period of time being devoted to turning the sprocket-wheel, which will thus receive only seventy-five turns, while the sprocket-wheel engaging with the other run of the chain will have seventy-five feet additional circumferential movement or twenty-five additional turns. It will therefore be seen that by applying a brake to either of the sprocket-wheels the bridge of the crane can be caused to move upon its runways in either direction, the speed of such movement being dependent wholly upon the braking force applied. In other words, the back-and-forth movements of the crane on its runways, commonly called the "bridge" movements, are performed by partial or complete seizure of either run of the driving-chain by the sprocket-wheel engaging therewith, the starting or stopping movement being effected as gradually as desired by the gradual application of the brake.

When high-speed ropes are used for driving, a very slight amount of braking will produce the desired movements of the bridge.

In order to keep the bridge square upon its runways, the gearing shown in Figs. 4, 4$^a$, 6, 7, 9, and 19 is employed.

On reference to Figs. 4, 4$^a$, and 7 it will be observed that each of the sprocket-wheels 34 and 36 has formed upon it a bevel-wheel 51, which wheels engage with bevel-wheels 52, carried by short transverse spindles 53 in a spur-wheel 54, the hub of which turns loosely upon an extension of the hub of the sprocket-wheel 36. When the wheels 34 and 36 rotate with equal velocity, the pinions 52 turn on their journals and no rotative movement is imparted to the spur-wheel 54, but if there is an increase in the speed of one sprocket-wheel and a corresponding decrease in the speed of the other the pinions 52 will, in addition to their axial revolution, revolve in an orbit around the shaft 40, and the spur-wheel 54 will turn in the direction of the sprocket-wheel having the highest velocity with a speed of rotation equal to one-half of the difference between the speeds of the two sprocket-wheels, and as no difference in the rotative velocity of the sprocket-wheels 34 and 36 can exist without corresponding movement of the crane along its runways it follows that the spur-wheel 54 will rotate precisely as it would if it was geared into a fixed rack laid above it and parallel with the runways.

By means of a spur-pinion 55 and shaft 56 the movement of the spur-wheel 54 is transmitted to a pinion 57 at the off end of the crane. This pinion 57 may be geared directly or indirectly with a rack laid along the runway for said off end of the crane, so that the latter will thus be propelled positively and in unison with the driving end; but instead of the rack I prefer to use a chain, which, while as positive as a rack, cannot be slipped or clogged with dirt.

Figure 6:
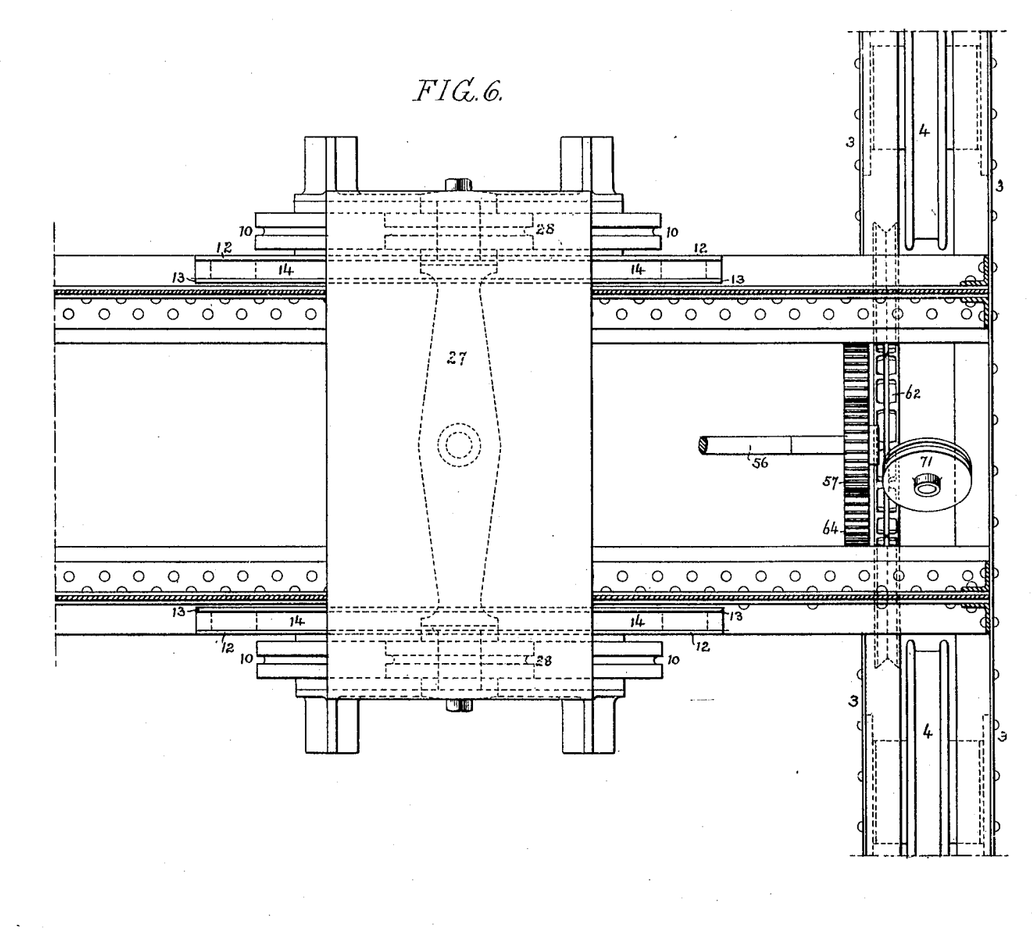
Fig. 6 is a plan view of the outer or squaring end of the crane and of the trolley mounted thereon.
Figure 6A:
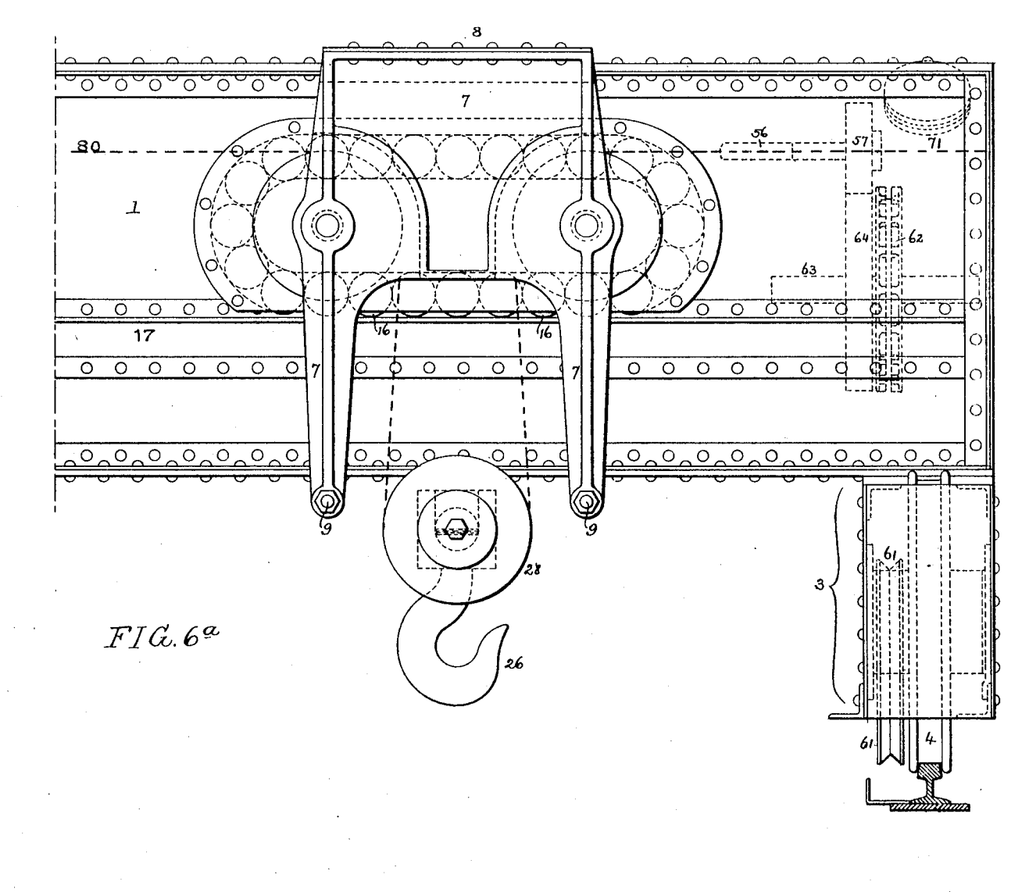
Figures 9, 21, 22:
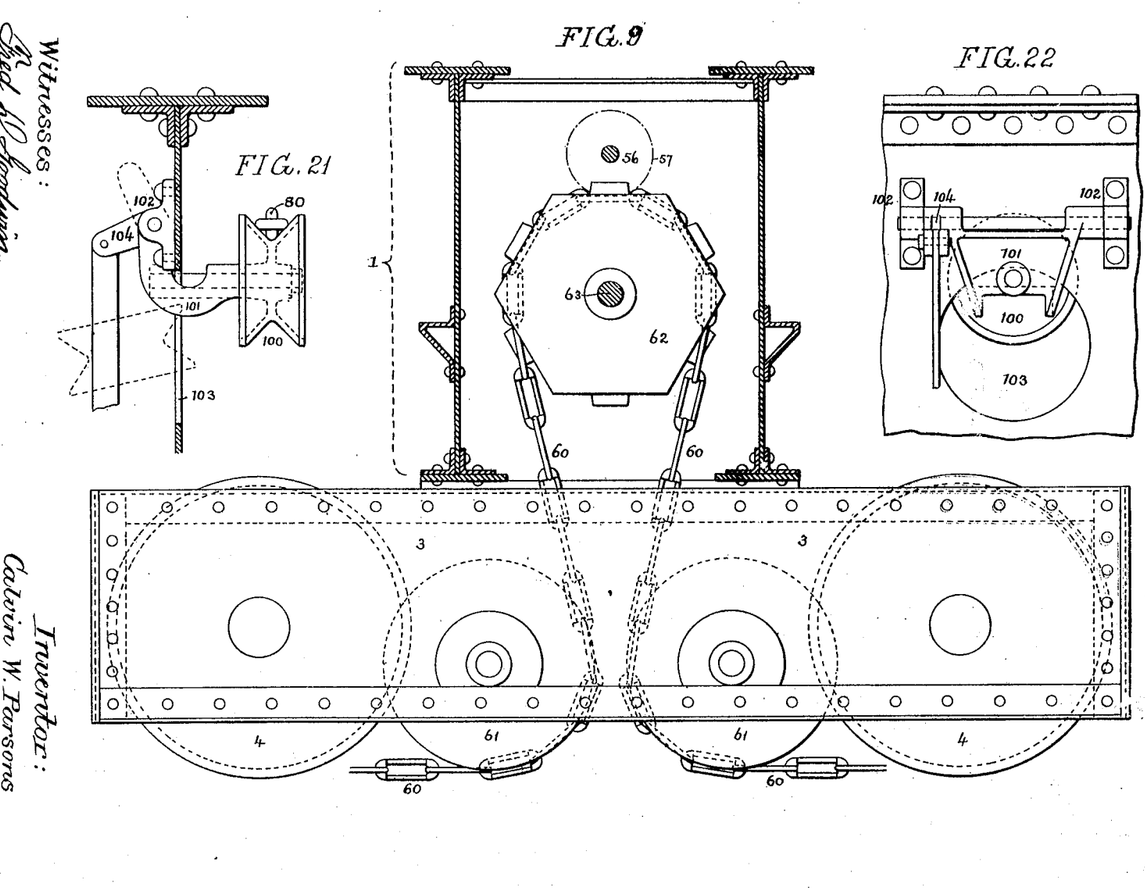
Fig. 9 is a like transverse section of the bridge of the crane, showing some of the gearing at the opposite or squaring end of said bridge.
Figs. 21 and 22 are respectively a transverse section, partly in elevation, and aside elevation of certain chain-supporting pulleys of the crane.

In Figs. 6, 9, and 19, therefore, 60 represents a standing chain extending along the runway at the top off end of the crane and suitably secured to said runway at each end of the same, this chain being led around sheaves 61 and over a sprocket-wheel 62, secured to a shaft 63, which has a spur-wheel 64, meshing with the spur-pinion 57 on the shaft 56, so that movement of said shaft 56 in either direction will cause the wheel 62 to run along the chain at precisely the same rate of travel as the driving end of the crane. It is manifest that as this shaft 56 has a positive rate of movement corresponding with that of the bridge of the crane it can, if desired, be geared to the truck-wheels of said bridge, so as to rotate the same, as in other cranes.

Figure 5:
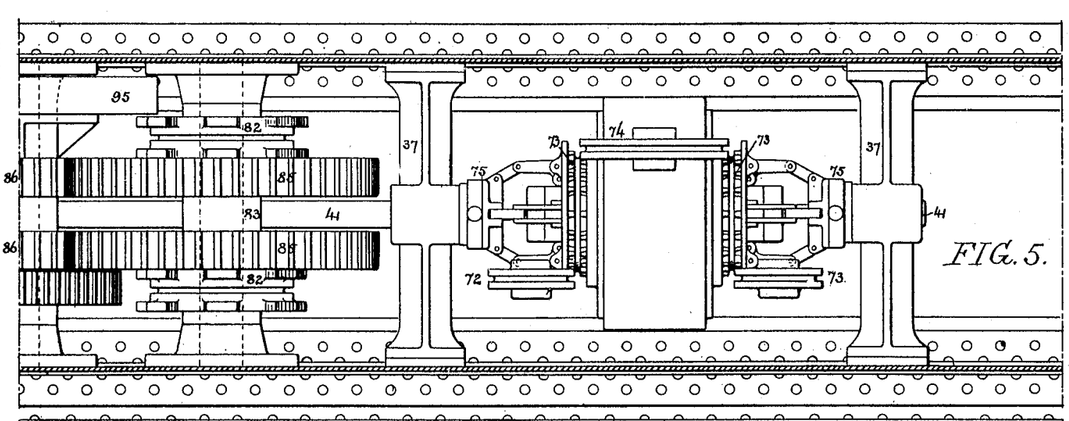
Fig. 5 is a plan view of part of the crane which is adjacent to the part shown in Fig. 4, so as to illustrate the remainder of the mechanism.
Figure 5A:
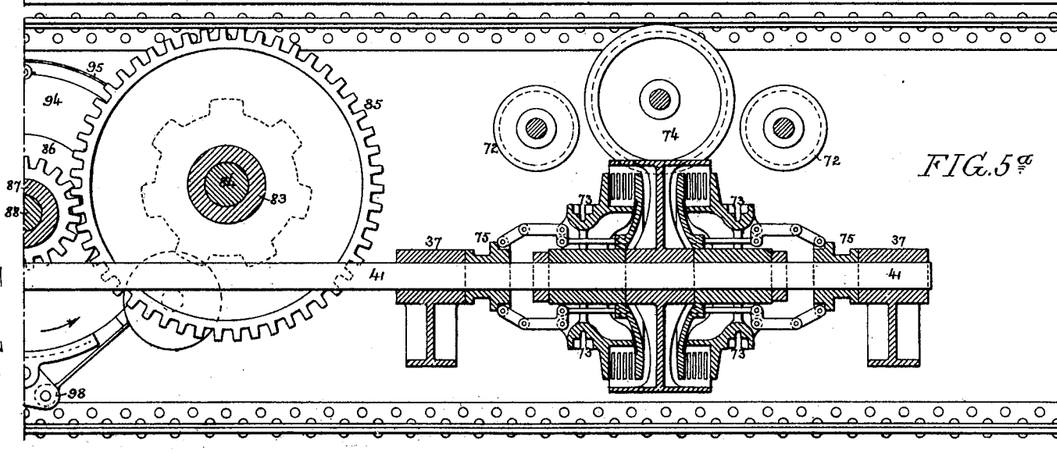

*Mechanism for moving the trolley.*—The top plate 8 of the trolley is connected to an endless chain 70, Fig. 20, this chain passing over the top of the bridge-girder from end to end and around suitable end sheaves 71, thence around sheaves 72 within the girder, and thence around sprocket-wheels 73, each of which can turn loosely on the shaft 41 or can be clutched thereto by any suitable form of clutching mechanism—such, for instance, as the friction-clutch shown in Fig. 5$^a$, (the well-known Weston disk clutch)— the slack or bight of the chain passing around a sheave 74. When one sprocket-wheel is clutched to and turns with the shaft 41, the other sprocket-wheel is released from the shaft and turns freely thereon, but in the reverse direction, the direction of movement of the trolley depending upon which of the sprocket-wheels is clutched to the shaft.

The mechanism shown for operating the trolley dispenses with reversing-gears and thereby materially simplifies this portion of the crane.

Figures 1, 3:
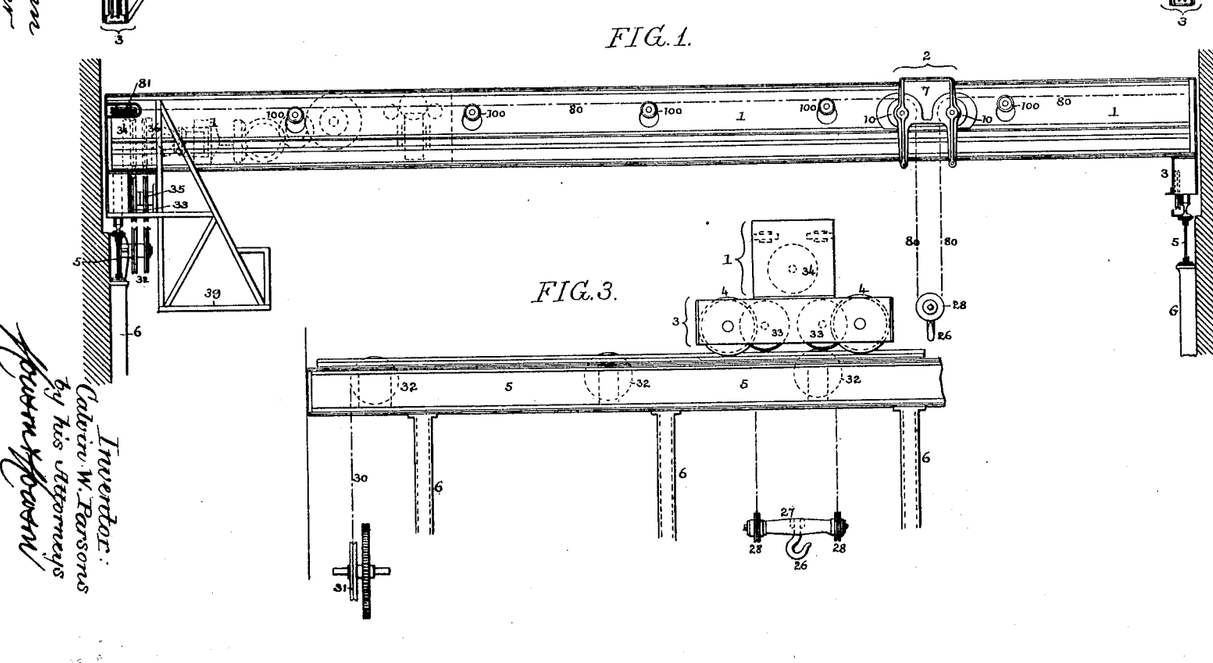
Figure 1 is a side view of my improved crane, illustrating the general features of the crane structure and its runways without any attempt to show details of the operating mechanism.
Fig. 3 is an end view.

*Hoisting mechanism.*—There is a hoisting-chain 80 on each side of the bridge-girder 1, as shown in Fig. 1, each chain being secured to the girder at the off end and passing thence around one of the trolley-sheaves 10, thence around the sheave 28 on the bar of the hoisting-hook, thence around the other trolley-sheave 10, thence around sheaves 81 at the inner or driving end of the bridge, and thence to the hoisting sprocket-wheels 82, Fig. 5, these wheels being secured to a sleeve 83, which turns on a transverse shaft 84, carried by the girder, and is provided with two spur-wheels 85, each of which meshes with a spur-pinion 86 on a sleeve 87, carried by a transverse shaft 88, said sleeve 87 having a spur-wheel 89, which meshes with a spur-pinion 90 on a short transverse shaft, having also a miter-wheel 91, Fig. 4, the latter wheel meshing with a miter-wheel 92, which can either turn loosely on the shaft 41 or can be clutched thereto by any suitable form of clutch mechanism, that shown in the drawings being a well-known form of friction-clutch operated by a sliding collar 93, the rod of which is within convenient reach of the attendant in the cage 39 at the driving end of the bridge. When the miter-wheel 92 is clutched to the shaft 41, therefore, the sprocket-wheels 82 will be rotated so as to pull upon the hoisting-chain, and when said miter-wheel 92 is released from the shaft 41 the sprocket-wheels 82 are permitted to turn backward, so as to lower the load.

A brake-wheel 94 is attached, preferably, to the sleeve carrying the pinions 86, this brake-wheel being engaged by a strap 95 and shoe 96, the latter carrying the operating-lever, which has three arms 97, 98, and 99. The arm 97 is the shortest and is connected to one end of the strap 95, the arm 98 being slightly longer and being connected to the opposite end of said strap, while the longest arm 99 is connected to the operating rod or cord, whereby the brake is released. This forms a differential brake, or, as it is commonly called, a "Napier" brake.

In hoisting the brake-wheel 94 turns in the direction of the arrows, Figs. 4$^a$ and 5$^a$, and drags upon its strap, which thus pulls upon the arm 98 of the lever, and as the latter rocks in obedience to this pull the arm 98 slacks off the strap faster than the arm 97 pulls it up. Consequently the brake automatically slacks itself in hoisting, but in lowering, when the brake-wheel 94 turns in the opposite direction, a reverse action takes place, so that the brake automatically tightens itself and will therefore sustain the load at any point. Hence in order to lower the load the brake must be slacked off by the attendant by a pull upon the arm 99.

The friction-surfaces in the driving-clutch and brake are made so large that hoisting and lowering at different speeds can be easily effected by the graduation of pressure by the attendant, and intermediate gearing for the purpose becomes a needless complication and expense.

The spur-gears 85 and 86 are made double in order to permit of the passage of the shaft 41 to the trolley-operating mechanism beyond them, and single spur-gears may, as will be evident, be used in place of the double spur-gears at a slight sacrifice of symmetry of strains on the bearings.

The hoisting-chain may pass through sheaves at the off end of the crane instead of being rigidly fastened to the girder, so that any difference in the stretch or length of the two parts of the chain will automatically compensate for itself.

The hoisting-chain is supported at convenient intervals along the sides of the bridge-girder by carrier-sheaves 100, as shown in Fig. 1, and in Figs. 21 and 22 each of these carrier-sheaves is supported upon an arm 101, hung to a bracket 102 on the inner side of one of the side webs of the girder, the arm passing through an opening 103 in said web.

The supporting-sheaves 100 are normally maintained in the projected position (shown by full lines in Fig. 21) either by means of a weight hung to an arm 104 or by means of a suitable spring; but as the trolley advances the projecting lower end 104$^b$ of a depending bar 104$^a$ on the arm 104 is struck by a portion of the same, as shown in Fig. 21$^a$, and said sheave is caused to swing inward through the opening in the side web of the girder, as shown by dotted lines in Fig. 21, until the trolley has passed it, whereupon it again swings outward into supporting position.

The number of sprocket-wheels 82 and of the hoisting-chains 80 may be increased to any desired extent. For instance, there may be two or more independent chains on each side of the girder, the sprocket-wheels and sheaves being made in multiple form to correspond, thereby distributing the wear and lessening the liability to accident, because if a weak link fails in one chain that chain only is disabled and the remaining ones will probably hold the load until relief can be had, whereas in using a single chain the failure of a link involves the dropping of the load. The hoisting and trolley mechanism can also be readily doubled, so as to provide for the independent use of two trolleys. It will also be manifest that ropes may be used in place of chains for hoisting and for trolley movement, the sprocket-wheels 73 and 82 in such case being replaced by sheaves, around each of which a number of turns of the rope may be taken to insure a proper hold. Hence such ropes and sheaves are considered to be the substantial equivalents of the chains and sprocket-wheels in the combinations claimed.

Having thus described my invention, I claim and desire to secure by Letters Patent—

1. A crane having a trolley-carrying portion in the form of a single rectangular box-girder, in combination with a trolley spanning or encircling said girder, and running on ways attached to the vertical webs of the girder on the outside of the same, substantially as specified.

2. The combination of the rectangular box-girder constituting the trolley-carrying portion of the crane, with the trolley running on ways secured to the side webs of the girder and having hoisting-chain sheaves outside of said ways, and means for rigidly bracing or retaining the opposite sides of the trolley above and below said supporting-points so as to prevent either spreading or collapse of the trolley, substantially as specified.

3. The combination of the rectangular box-girder constituting the trolley-carrying portion of the crane, with the trolley running upon ways secured to the outer vertical webs of the girder and having hoisting-chain sheaves outside of said ways, and means for bracing or retaining the opposite sides of the trolley to prevent distortion of the same, said braces or retainers consisting of rollers running against rails or ways carried by the girder, substantially as specified.

4. The combination of the rectangular box-girder constituting the trolley-carrying portion of the crane, with the trolley running upon ways secured to the vertical webs of the girder, and having hoisting-chain sheaves outside of said ways, and braces or retainers for the sides of the trolley located above and below the supporting-points of said trolley, and consisting of rollers running against rails or ways carried by the girder, substantially as specified.

5. The combination of the rectangular box-girder constituting the trolley-carrying portion of the crane, and having ways or tracks on the vertical webs, with a trolley having rollers, roller-bearing blocks, roller-housing, and hoisting-chain sheaves, the said bearing-blocks carrying the inner ends of the spindles on which said chain-sheaves turn, substantially as specified.

6. The combination of the rectangular box-girder constituting the trolley-carrying portion of the crane, and the hoisting-chain extending from end to end of the girder with the trolley mounted on said girder and having sheaves for the hoisting-chains located at or near the lower flange of the girder whereby the tension upon the hoisting-chain serves to partially counterbalance the tension upon the lower flange of the girder, substantially as specified.

7. The combination of the rectangular box-girder forming the trolley-carrying portion of the crane, the trolley mounted on the outside of said girder and carrying sheaves for the hoisting-chain, and the hoisting mechanism located on the inside of the girder, substantially as specified.

8. The combination of the rectangular box-girder constituting the trolley-carrying portion of the crane, with the trolley mounted on the outside of the girder and carrying sheaves for the hoisting-chain, and the trolley and hoisting-chain-operating mechanism on the inside of the same, substantially as specified.

9. The combination of the rectangular box-girder, the trolley mounted thereon and having at each side a sheave for the hoisting-chain, a hoisting-chain passing around the trolley-sheaves, around sheaves on the outside of the girder, and around suitable guide-sheaves on the inside of the girder, sprocket-wheels on the inside of the girder, one for each end of the chain, and mechanism for rotating said sprocket-wheels, substantially as specified.

10. The combination of the rectangular box-girder, the trolley mounted on the outside of the same and having the sheaves for the hoisting-chain, a hoisting-chain running along each of the sides of the girder from end to end, sprocket-wheels on the inside of the girder for operating said chains, and carrier-sheaves for the chains on opposite sides of the girder, said carrier-sheaves being mounted on arms pivoted on the inside of the girder and projecting through openings in the side webs of the same so that the sheaves can swing out of the way when the trolley passes them, substantially as specified.

In testimony whereof I have signed my name to this specification in the presence of two subscribing witnesses.

CALVIN W. PARSONS.

Witnesses:
H. M. WALTON,
H. H. EATON.